United States Patent
Chang

(10) Patent No.: US 11,852,314 B1
(45) Date of Patent: Dec. 26, 2023

(54) VEHICLE LAMP HAVING DIPPED AND MAIN BEAM HEADLIGHT SWITCHING STRUCTURE

(71) Applicant: SONAR AUTO PARTS CO., LTD., New Taipei (TW)

(72) Inventor: Chung-Yi Chang, Hsinchu County (TW)

(73) Assignee: SONAR AUTO PARTS CO., LTD., New Taipei (TW)

( * ) Notice: Subject to any disclaimer, the term of this patent is extended or adjusted under 35 U.S.C. 154(b) by 0 days.

(21) Appl. No.: 18/161,850

(22) Filed: Jan. 30, 2023

(51) Int. Cl.
*F21S 41/683* (2018.01)
*F21S 45/40* (2018.01)
*F21S 41/148* (2018.01)
*F21S 41/43* (2018.01)
*F21S 41/32* (2018.01)
*F21S 41/27* (2018.01)
(Continued)

(52) U.S. Cl.
CPC .......... *F21S 41/683* (2018.01); *F21S 41/148* (2018.01); *F21S 41/27* (2018.01); *F21S 41/32* (2018.01); *F21S 41/43* (2018.01); *F21S 45/40* (2018.01); *F21S 41/147* (2018.01); *F21S 41/36* (2018.01); *F21S 41/39* (2018.01); *F21S 41/395* (2018.01); *F21S 41/689* (2018.01); *F21S 41/692* (2018.01); *F21S 45/48* (2018.01); *F21W 2102/13* (2018.01)

(58) Field of Classification Search
CPC ........ F21S 41/147; F21S 41/148; F21S 41/36; F21S 41/39; F21S 41/395; F21S 41/683; F21S 41/689; F21S 41/692; F21S 45/48
See application file for complete search history.

(56) References Cited

U.S. PATENT DOCUMENTS 11,047,545 B1 * 6/2021 Chang ................. F21S 41/25
2008/0062692 A1 3/2008 Andersen et al.
(Continued)

FOREIGN PATENT DOCUMENTS

| CN | 101042218 A | 9/2007 |
| CN | 106016131 A | 10/2016 |

(Continued)

OTHER PUBLICATIONS

Machine translation of JP 2014007048 A retrieved from the FIT database of PE2E search. (Year: 2023).*

(Continued)

*Primary Examiner* — Colin J Cattanach
(74) *Attorney, Agent, or Firm* — Li & Cai Intellectual Property Office

(57) ABSTRACT

The vehicle lamp having a dipped and main beam headlight switching structure includes a heat-dissipating device, an LED light source, an electromagnet, a light-reflecting assembly, a lens assembly, a light-shaping plate and a driving rod. The LED light source and the electromagnet are disposed on the heat-dissipating device. The light-shaping plate is rotatably disposed above the electromagnet. The driving rod is disposed between the electromagnet and the light-shaping plate. The electromagnet is configured to drive the driving rod to move the light-shaping plate to the first position or the second position, so as to change the reflected light to form near light or far light. An empty space is formed between the lens assembly and the heat-dissipating device for accommodating components.

9 Claims, 10 Drawing Sheets

(51) Int. Cl.
*F21W 102/13*     (2018.01)
*F21S 41/147*     (2018.01)
*F21S 41/692*     (2018.01)
*F21S 45/48*      (2018.01)
*F21S 41/689*     (2018.01)
*F21S 41/39*      (2018.01)
*F21S 41/36*      (2018.01)

(56) References Cited

U.S. PATENT DOCUMENTS

| | | | |
|---|---|---|---|
| 2012/0275161 A1* | 11/2012 | Rottstaedt | F21S 41/689 362/277 |
| 2014/0092617 A1* | 4/2014 | Yokoi | F21S 41/698 362/512 |
| 2016/0290589 A1 | 10/2016 | Redjem-Saad et al. | |
| 2018/0272925 A1* | 9/2018 | Wang | B60Q 1/10 |
| 2019/0056082 A1* | 2/2019 | Abe | F21S 41/00 |
| 2019/0366910 A1* | 12/2019 | Abe | F21S 41/689 |

FOREIGN PATENT DOCUMENTS

| | | | |
|---|---|---|---|
| CN | 106594626 A | * | 4/2017 |
| CN | 106594626 A | | 4/2017 |
| JP | 2014007048 A | * | 1/2014 |
| TW | M638713 U | | 3/2023 |

OTHER PUBLICATIONS

Machine translation of CN 106594626 A retrieved from the FIT database of PE2E search. (Year: 2023).*

* cited by examiner

VEHICLE LAMP HAVING DIPPED AND MAIN BEAM HEADLIGHT SWITCHING STRUCTURE

FIELD OF THE DISCLOSURE

The present disclosure relates to a vehicle lamp, and more particularly to a car lamp having a far and near light switching structure mounted on a vehicle.

BACKGROUND OF THE DISCLOSURE

A headlight is arranged on the front of motor vehicles such as automobiles or locomotives, and the headlight includes a lamp holder and a car lamp source installed in the lamp holder. The car lamp source can be switched between a high beam and a low beam. The existing high beam lamp and low beam lamp can use a switching structure to switch the high beam or low beam so as to change the reflected light of the light source to achieve the function of switching the high beam and low beam. The curved structure of the reflecting mirror group for reflecting the light is complex, and it needs to reflect the low beam and the high beam, and the manufacturing cost is high.

Compared with the bulbs of traditional car lamps, car lamps using LEDs as light sources are usually equipped with heat sinks, which increase the occupied volume, resulting in the inability to make good use of the space around the car lamps.

SUMMARY OF THE DISCLOSURE

In response to the above-referenced technical inadequacy, the present disclosure provides a vehicle lamp (such as a car lamp) having a dipped and main beam headlight switching structure (or a far and near light switching structure) to efficiently use or make better use of the space around the headlight.

In order to solve the above-mentioned problems, one of the technical aspects adopted by the present disclosure is to provide a vehicle lamp having a dipped and main beam headlight switching structure, which includes a heat-dissipating device, an LED light source, an electromagnet, a light-reflecting assembly, a lens assembly, a light-shaping plate and a driving rod. The LED light source disposed on the heat-dissipating device. The electromagnet is disposed on the heat-dissipating device. The light-reflecting assembly is located above the LED light source. The lens assembly is located in front of the light-reflecting assembly, the light-reflecting assembly is configured to reflect light emitted by the LED light source to form reflected light, and the lens assembly is configured to allow the light to pass therethrough. The light-shaping plate is rotatably disposed between the light-reflecting assembly and the lens assembly, the light-shaping plate is pivotally disposed on the heat-dissipating device along a rotating shaft, and the light-shaping plate is configured to be movably located at one of a first position and a second position. The driving rod is disposed between the electromagnet and the light-shaping plate, and the electromagnet is configured to drive the driving rod to move the light-shaping plate to the first position or the second position, so as to change the reflected light to form near light or far light. The lens assembly has a frame and a lens, the lens is fixed on a front side of the frame, the frame is fixed on the heat-dissipating device, and an empty space is formed between the frame and the heat-dissipating device for accommodating components.

In one of the possible or preferred embodiments, the heat-dissipating device has two lateral frames disposed on a front side thereof, and an accommodating space is formed inwardly between the two lateral frames, the electromagnet is accommodated in the accommodating space, and the electromagnet includes an outer partition fixed on the two lateral frames for enclosing the opening of the accommodating space.

In one of the possible or preferred embodiments, the driving rod has a pivot portion, an active side and a driven side, the active side and the driven side are connected to two sides of the pivot portion, the pivot portion is pivotally disposed on a pivot of the heat-dissipating device, the active side is connected to the electromagnet, and the driven side is abutted against the light-shaping plate. The active side is movable along a direction perpendicular to an optical axis, the driven side is movable along a back and forth direction to change a power transmission direction of the electromagnet and the light-shaping plate.

In one of the possible or preferred embodiments, the electromagnet has an actuating rod, the light-shaping plate has a shielding portion and a linkage portion, the linkage portion is connected to the shielding portion, the active side is connected to the actuating rod of the electromagnet, and the driven side is connected to the linkage portion of the light-shaping plate. When the electromagnet is activated, the actuating rod is configured to drive and move the light-shaping plate through the driving rod. The active side is abutted against the actuating rod of the electromagnet, and the driven side is abutted against the linkage portion of the light-shaping plate.

In one of the possible or preferred embodiments, the vehicle lamp further includes an adjusting rod, and the light-shaping plate having a force bearing portion disposed under the rotating shaft. The heat-dissipating device is provided with an adjusting groove and an adjusting screw seat, the adjusting groove extends forward from a rear side of the heat-dissipating device, the adjusting screw seat is located in the adjusting groove and adjacent to the light-shaping plate, the adjusting rod is screwed to the adjusting screw seat of the heat-dissipating device, one side of the adjusting rod is exposed from the rear side of the heat-dissipating device for adjustment, and another side of the adjusting rod abuts against the force bearing portion of the light-shaping plate.

In one of the possible or preferred embodiments, the light-shaping plate has a shielding portion and a linkage portion, the linkage portion is connected to the shielding portion, the driving rod is connected to the linkage portion of the light-shaping board, the shielding portion has a bottom plate and a rear plate, the rear plate is shaped as an arc-shaped plate, the rear plate is erected on an edge of the bottom plate, the bottom plate and the rear plate obliquely intersect with each other to form an included angle that is formed between the bottom plate and the rear plate and is greater than 90 degrees, and a height of the rear plate decreases from two sides of the rear plate toward a middle of the rear plate.

In one of the possible or preferred embodiments, the electromagnet is disposed on a front side of the heat-dissipating device, and the electromagnet is horizontally placed on the front side of the heat-dissipating device.

In one of the possible or preferred embodiments, the light-shaping plate is located above the electromagnet, and an elastic element is disposed between the heat-dissipating device and the light-shaping plate to provide an elastic force for resetting the light-shaping plate so as to move the light-shaping plate to the first position.

In one of the possible or preferred embodiments, the light-reflecting assembly includes an upper reflecting seat and a lower reflecting seat, the lower reflecting seat is shaped as a U shape and fixed to the heat-dissipating device, the upper reflecting seat is fixed on a top surface of the lower reflecting seat, the light reflected by the lower reflecting seat of the LED light source forms a high beam, and the light reflected by the lower reflecting seat of the LED light source forms a low beam.

In one of the possible or preferred embodiments, the lower reflecting seat has a lower reflection part and a lower assembly plate, the lower assembly plate is connected around a top edge of the lower reflection part, the heat-dissipating device has a plurality of positioning posts protruded upwardly from the carrier base thereof, the lower assembly plate has a plurality of lower positioning holes, and the lower positioning holes are respectively sleeved on the positioning posts. The upper reflecting seat has an upper reflection part and an upper assembly plate, the upper assembly plate is connected around a bottom edge of the upper reflection part, the upper assembly plate forms a plurality of upper positioning holes and a plurality of screw holes, the upper positioning holes of the upper assembly plate are respectively sleeved on the positioning posts, and the upper reflecting seat and the lower reflecting seat are fixed to the heat-dissipating device.

Therefore, the beneficial effect of the present disclosure is that the light-shaping plate is rotatably disposed between the light-reflecting assembly and the lens assembly, the light-shaping plate is pivotally disposed on the heat-dissipating device along a rotating shaft, and the light-shaping plate is configured to be movably located at one of a first position and a second position, the driving rod is disposed between the electromagnet and the light-shaping plate, and the electromagnet can be configured to drive the driving rod to move the light-shaping plate to the first position or the second position, so as to change the reflected light to form near light or far light.

Furthermore, the lens assembly includes a frame and a lens, the lens is fixed to the front side of the frame, the frame is fixed to the heat-dissipating device, and an empty space is formed between the frame and the heat-dissipating device for accommodating other components.

Moreover, the adjusting rod is disposed on the heat-dissipating device. One side of the adjusting rod abuts against the force bearing portion of the light-shaping plate. When the adjusting rod is rotated, the adjusting rod can push the force bearing portion to drive and adjust the light-shaping plate, so that the light-shaping plate can be rotated through the force bearing portion, and the light-shaping plate can be fine-tuned to an optimal position to calibrate the light-shape.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
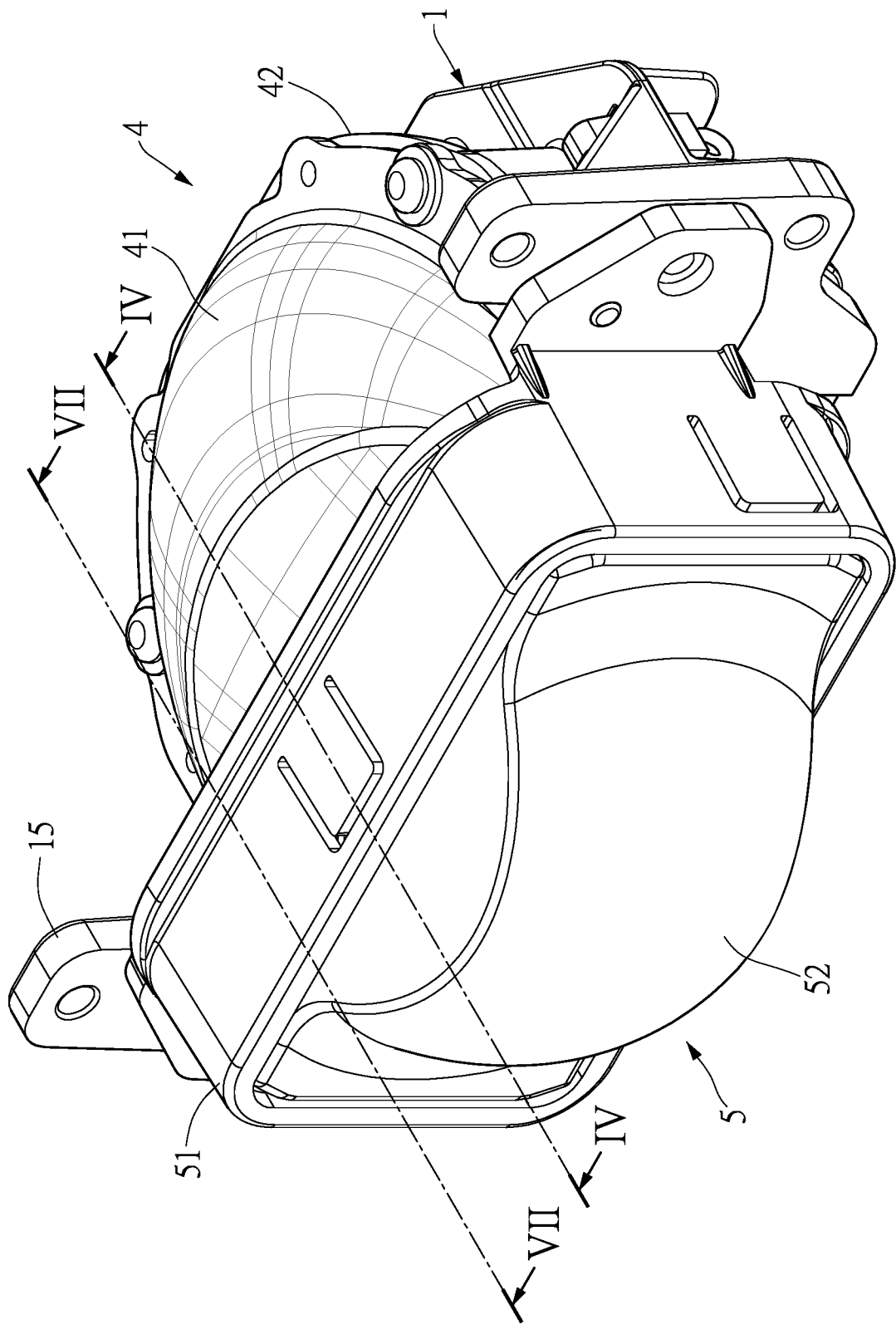
FIG. 1 is a perspective view of a vehicle lamp having a far and near light switching structure according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 2:
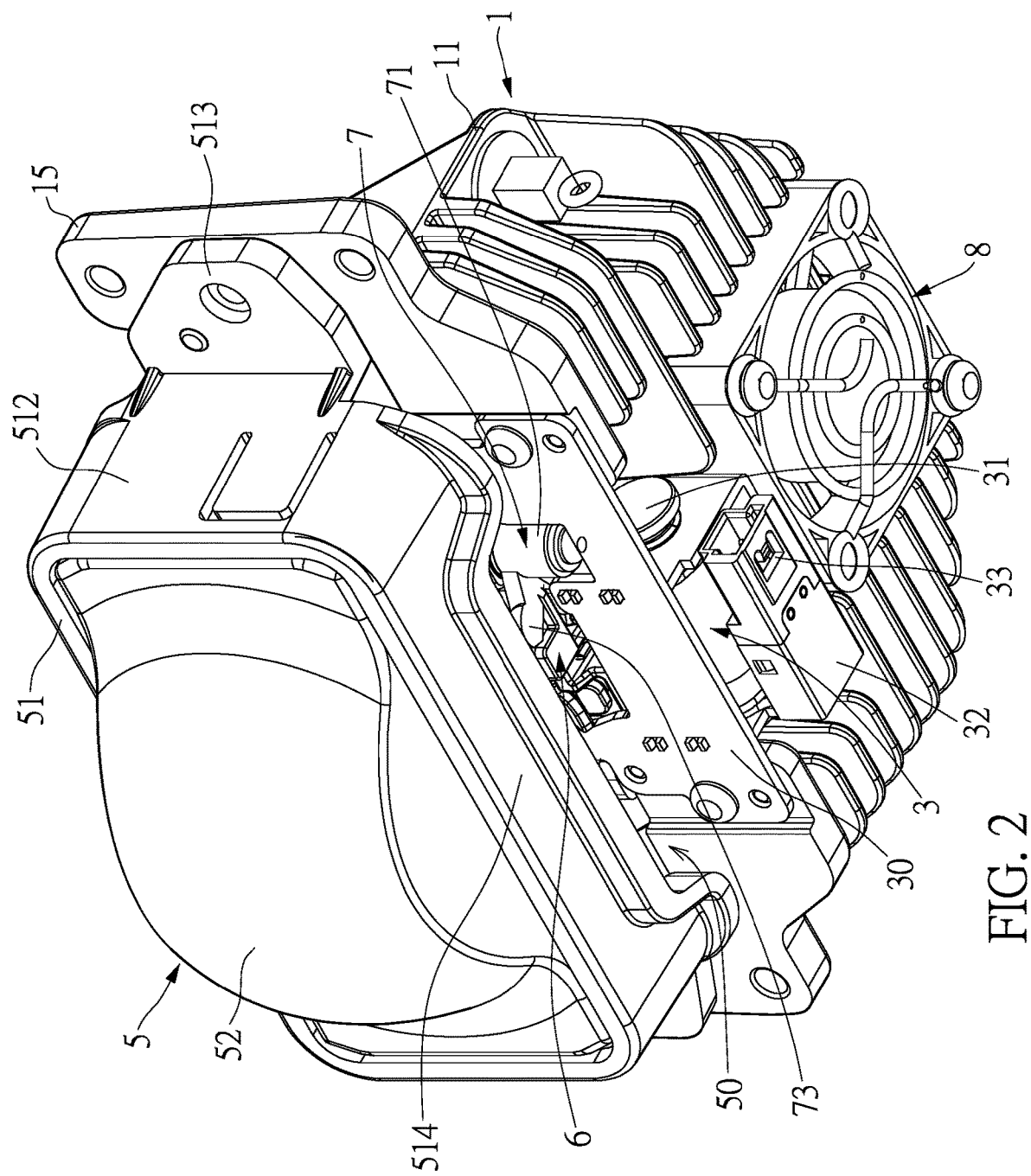
FIG. 2 is another perspective view of the vehicle lamp having the far and near light switching structure of the present disclosure.
Figure 3:
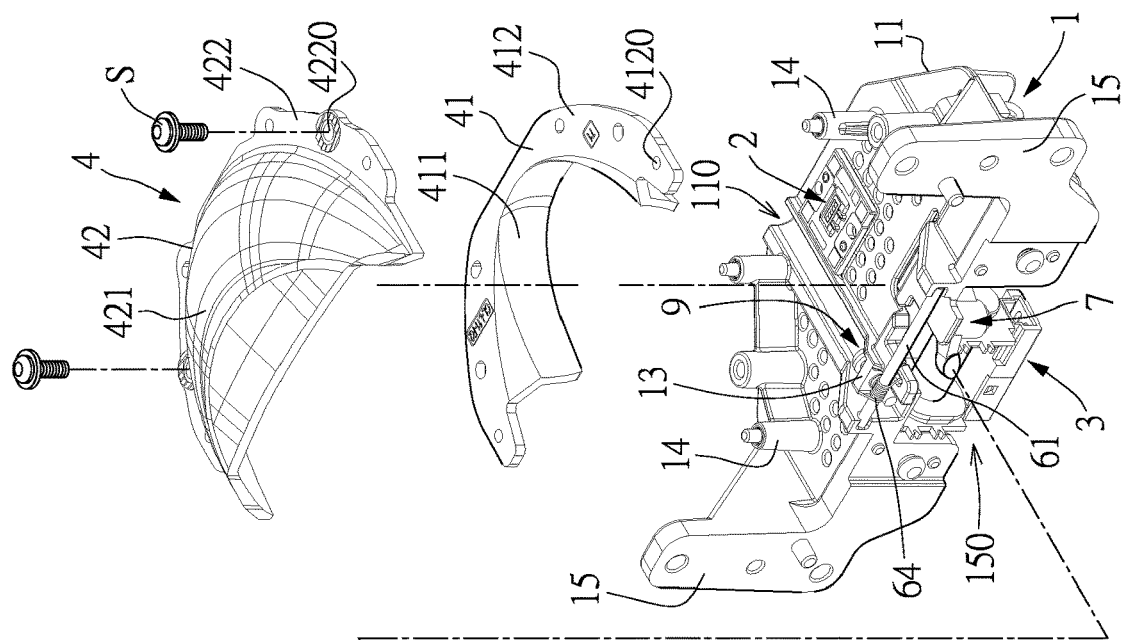
FIG. 3 is a perspective exploded view of the vehicle lamp having the far and near light switching structure according to the present disclosure.
Figure 3:
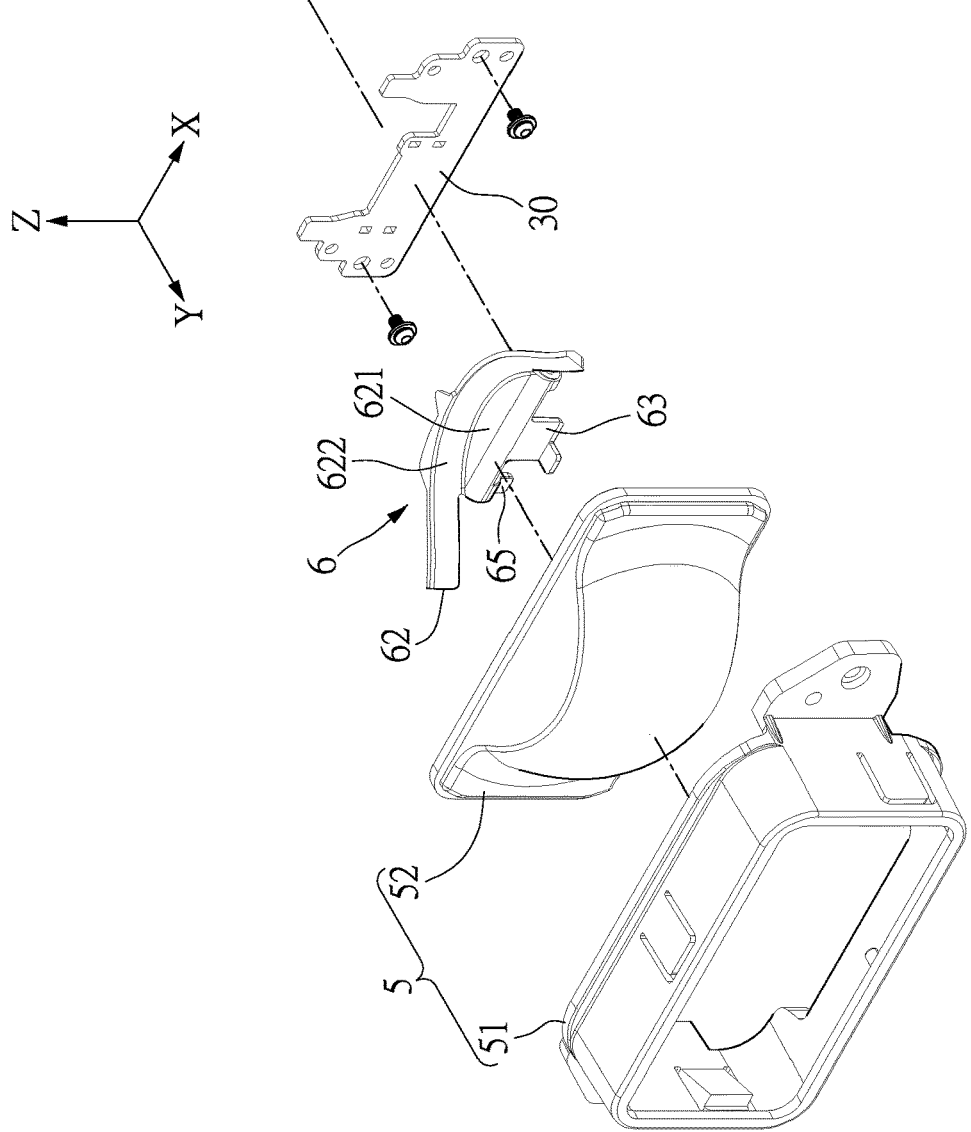

Referring to FIG. 1 to FIG. 3, the present disclosure provides a vehicle lamp having a dipped and main beam headlight switching structure (or a far and near light switching structure), which can be installed in a vehicle such as automobile, motorcycle or scooter for switching high beam (i.e., far light) or low beam (i.e., near light) by controlling the dipped and main beam headlight switching structure. The vehicle lamp includes a heat-dissipating device 1 (or a cooling device, or a heat sink), an LED light source 2, an electromagnet 3, a light-reflecting assembly 4, a lens assembly 5, a light-shaping plate 6 (or a light pattern adjusting plate), a driving rod 7, a heat-dissipating fan 8 (or a cooling fan), and an adjusting rod 9. For the convenience of description, in the present disclosure, the light-emitting direction is referred to as the front, and the opposite direction is referred to as the rear.

As shown in FIG. 3, the heat-dissipating device 1 can be made of a metal material (such as copper or aluminum) with good thermal conductivity. The LED light source 2 is disposed on the heat-dissipating device 1. In this embodiment, the heat-dissipating device 1 has a carrier base 11, and the LED light source 2 is disposed on the carrier base 11. The LED light source 2 can emit light upward. The high temperature generated by the LED light source 2 can be transferred to the heat-dissipating device 1, so that the heat-dissipating device 1 can be used to dissipate the heat generated by the LED light source 2.

More particularly, the heat-dissipating device 1 has a pair of lateral frames 15 disposed on the front end thereof, and an accommodating space 150 is recessed between the pair of lateral frames 15. The electromagnet 3 is accommodated in the accommodating space 150, and the electromagnet 3 further includes an outer partition 30 fixed between the pair of lateral frames 15 and enclosing the opening of the accommodating space 150. As shown in FIG. 2, the electromagnet 3 of the embodiment is hidden inside the heat-dissipating device 1. The outer partition 30 is substantially flush with the pair of lateral frames 15.

In this embodiment, a heat-dissipating fan 8 can be installed on the bottom surface of the heat-dissipating device 1 to provide an active heat-dissipating function. The heat-dissipating fan 8 can be positioned on the heat-dissipating device 1 through a screw. The heat-dissipating fan 8 is correspondingly disposed under the LED light source 2 and is located behind the electromagnet 3.

Referring to FIG. 2 and FIG. 3, the electromagnet 3 is fixed on the heat-dissipating device 1 through a fixing panel 30. The electromagnet 3 of the embodiment is concealingly or hiddenly arranged under the heat-dissipating device 1. As shown in FIG. 3, the electromagnet 3 has an actuating rod 31 (or an action rod) for outputting power. A Zener diode 32 and a connector 33 are further disposed on the bottom of the electromagnet 3. The Zener diode 32 is electrically connected between the electromagnet 3 and the connector 33. The Zener diode 32 can provide the function of stabilizing voltage. The connector 33 can be used to input power, so that the power can be transmitted to the electromagnet 3 through the Zener diode 32 so as to control the operation of the electromagnet 3. The fixed panel 30 of the embodiment is disposed outside the coil of the electromagnet 3, which can isolate heat.

Figure 4:
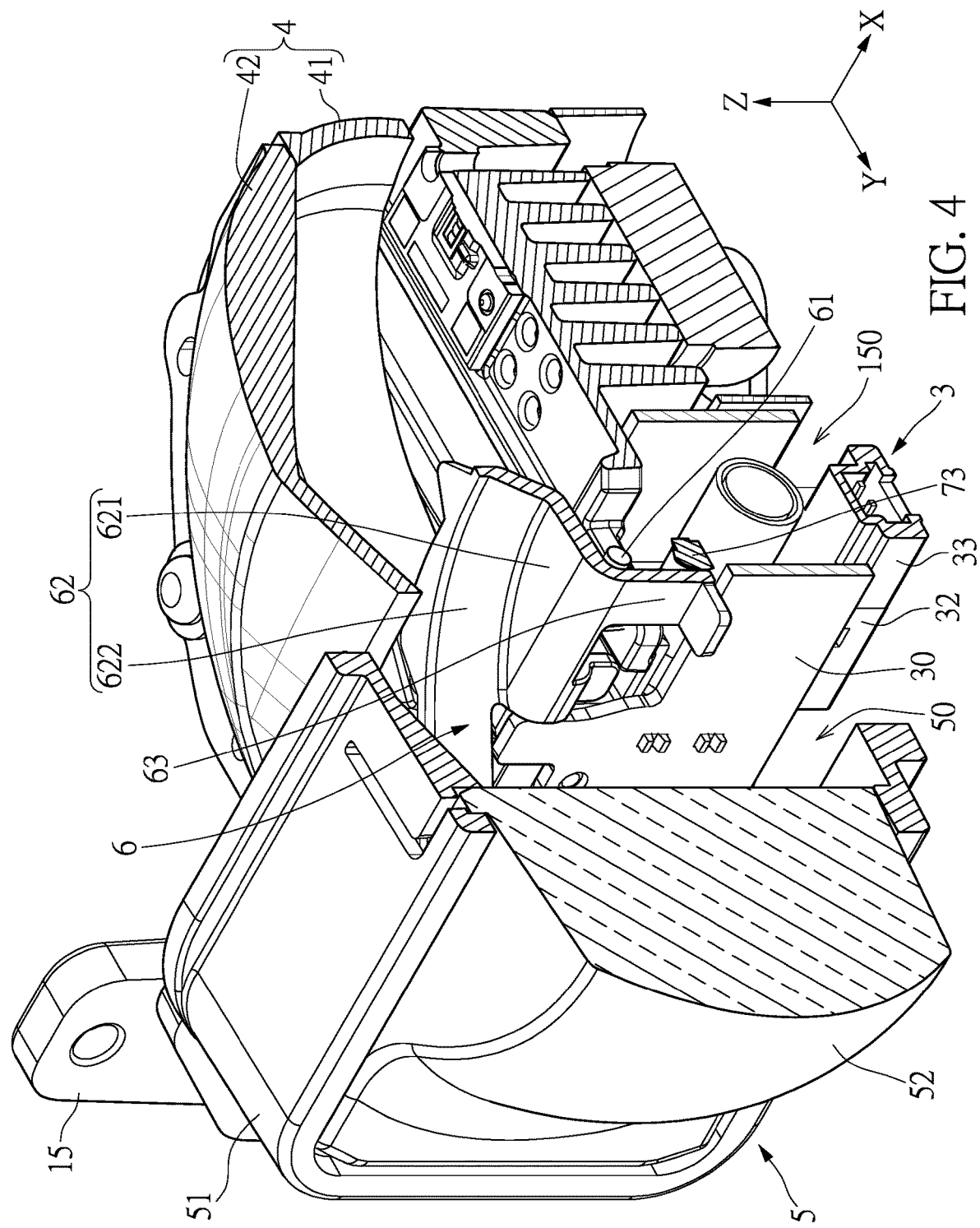
FIG. 4 is a perspective cross-sectional view taken along line IV-IV of FIG. 1.
Figure 5:
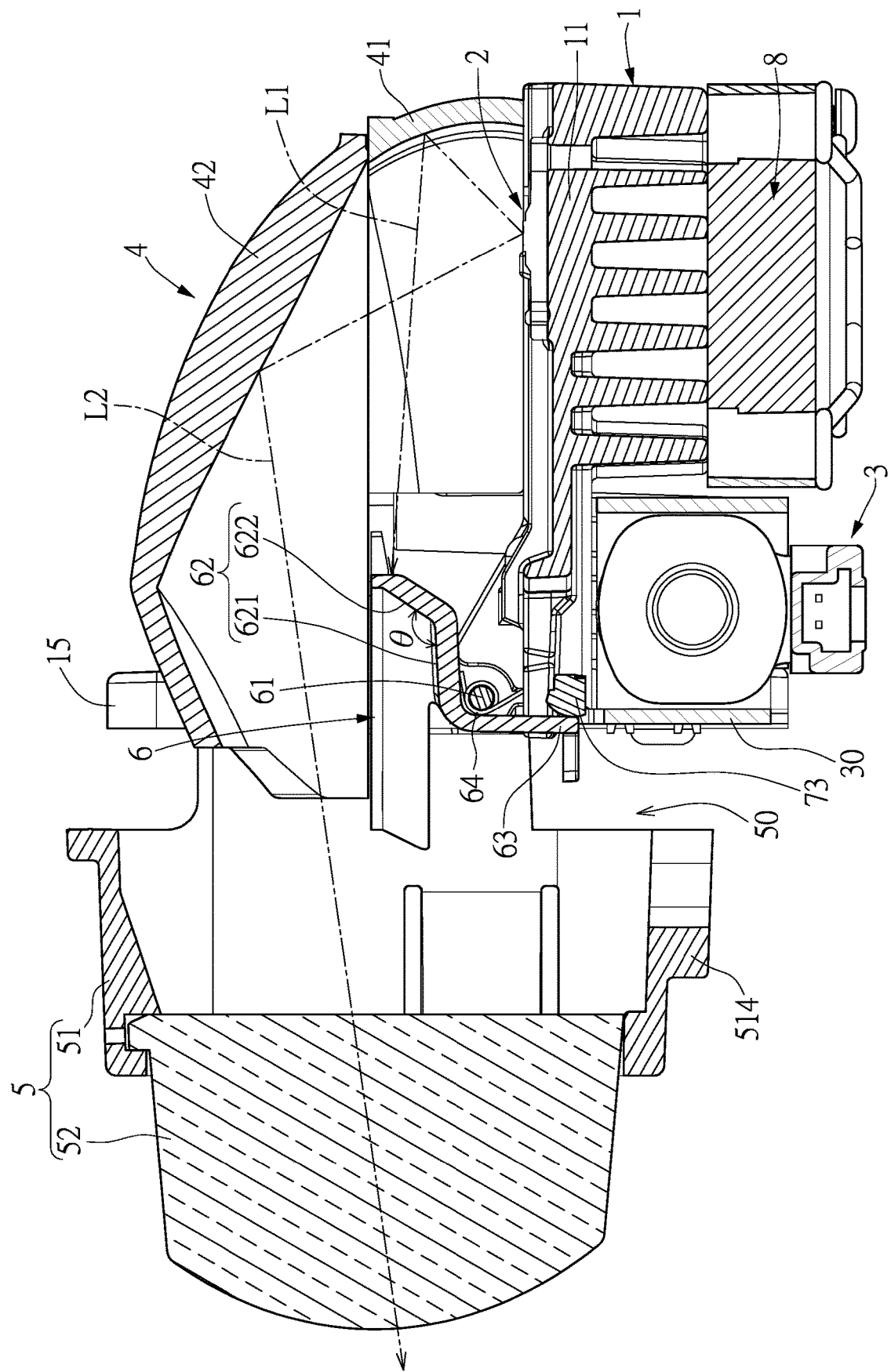
FIG. 5 is a planar cross-sectional view taken along line IV-IV of FIG. 1.

As shown in FIG. 3 to FIG. 5, the light-reflecting assembly 4 is located above the LED light source 2. In this embodiment, the light-reflecting assembly 4 includes an upper reflecting seat 42 (or an upper light-reflecting base) and a lower reflecting seat 41 (or a lower light-reflecting base). The lower reflecting seat 41 has a U shape and is fixed on the heat-dissipating device 1, and the upper reflecting seat 42 is fixed on the top surface of the lower reflecting seat 41 to collectively form a reflective surface. The reflective surface is located inside the light-reflecting assembly 4.

As shown in FIG. 3, more particularly, the lower reflecting seat 41 has a lower reflection part 411 and a lower assembly plate 412. The lower assembly plate 412 is connected around the top edge of the lower reflection part 411. In this embodiment, the principle of multiple points defining a coplanar plane is utilized, and four positioning posts 14 protrude upward from the carrier base 11 of the heat-dissipating device 1. The lower assembly plate 412 forms four lower positioning holes 4120, and the lower assembly plate 412 is sleeved on the four positioning posts 14. The upper reflecting seat 42 has an upper reflection part 421 and an upper assembly plate 422. The upper assembly plate 422 is connected around the bottom edge of the upper reflection part 421. The upper assembly plate 422 forms four upper positioning holes 4220 and two screw holes. Each screw hole is located between two sidemost and adjacent ones of the four upper positioning holes 4220. The four upper positioning holes 4220 of the upper assembly plate 422 are also sleeved on the same four positioning posts 14. Finally, the upper reflecting seat 42 and the lower reflecting seat 41 are positioned on the heat-dissipating device 1 through two screws S. The upper reflecting seat 42 and the lower reflecting seat 41 of the embodiment can be manufactured separately, so that the molding or forming is relatively easy. In addition, the upper reflecting seat 42 and the lower reflecting seat 41 can be made of different materials to reduce cost.

As shown in FIG. 1 to FIG. 2, the lens assembly 5 is located in front of the light-reflecting assembly 4. The lens assembly 5 of the embodiment is fixed on the heat-dissipating device 1. More particularly, the lens assembly 5 includes a frame 51 and a lens 52, both sides of the frame 51 are locked or fixed to the pair of lateral frames 15 disposed on both sides of the front side of the heat-dissipating device 1, and the lens 52 is fixed to the front side of the frame 51. More specifically, the frame 51 has a rectangular cylindrical shape and has a pair of sidewalls 512. Each sidewall 512 extends to form a locking portion 513 to be screwed to the lateral frame 15. The bottom wall 514 of the frame 51 is slightly U-shaped, and separate from the fixed panel 30 of the electromagnet 3 by a distance. A feature of the embodiment is that an empty space 50 is formed between the frame 51 and the heat-dissipating device 1 for accommodating other components, such as other components in the headlight. In addition, the lens 52 is clamped and fixed to the front opening of the frame 51, and there is no screw hole or connecting part formed on the lens 52, which can reduce the manufacturing cost of the lens 52.

The light emitted by the LED light source 2 can be reflected by the reflective surface of the light-reflecting assembly 4, and then emit to the outside through the lens assembly 5. In this embodiment, the light generated by the LED light source 2 is reflected by the lower reflecting seat 41 to form a high beam (i.e., far light), and the light generated by the LED light source 2 is reflected by the upper reflecting seat 42 to form a low beam (i.e., near light).

Figure 6:
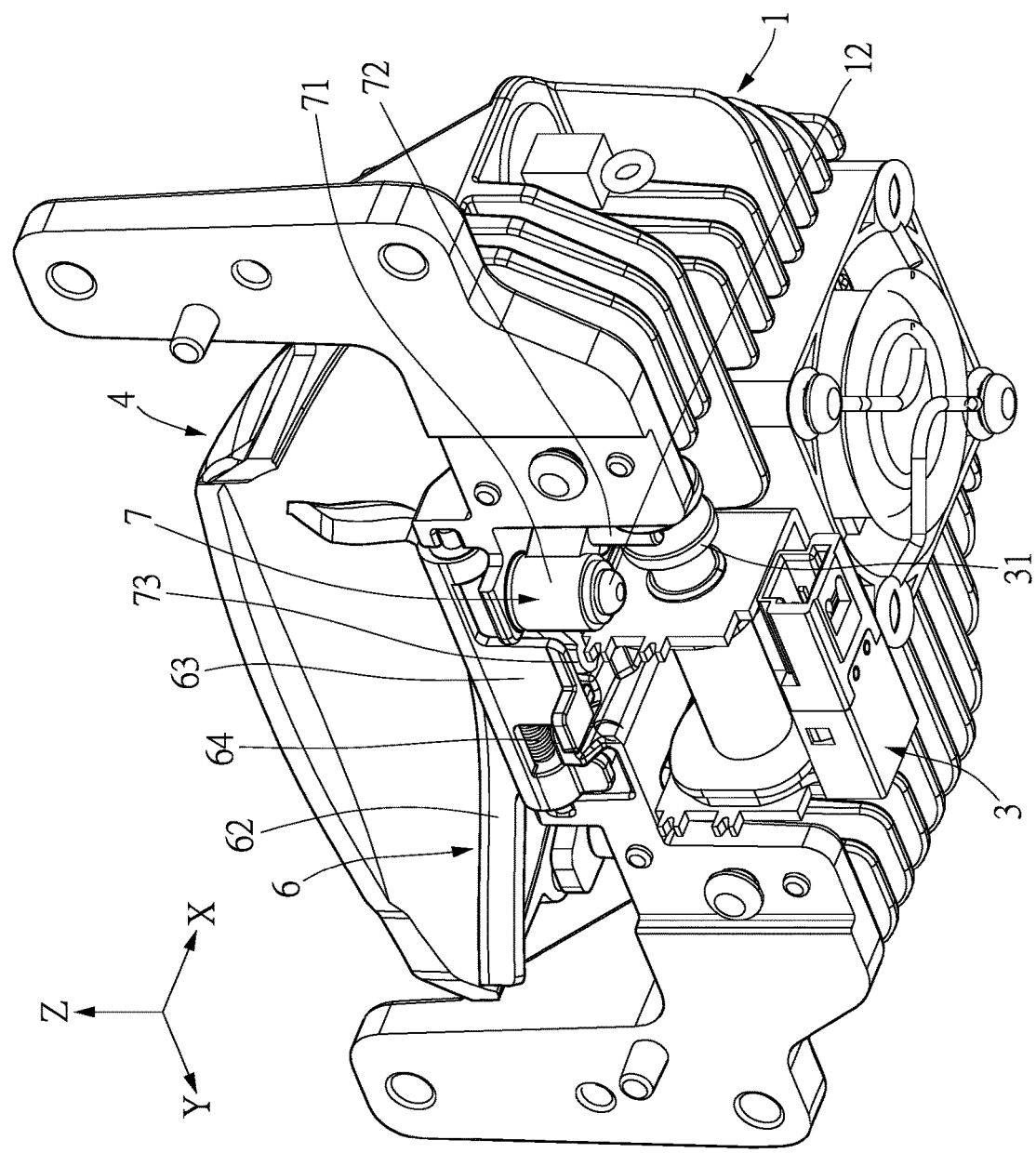
FIG. 6 is a schematic view of a driving rod and a light-shaping plate in a low beam state according to the present disclosure.
Figure 8:
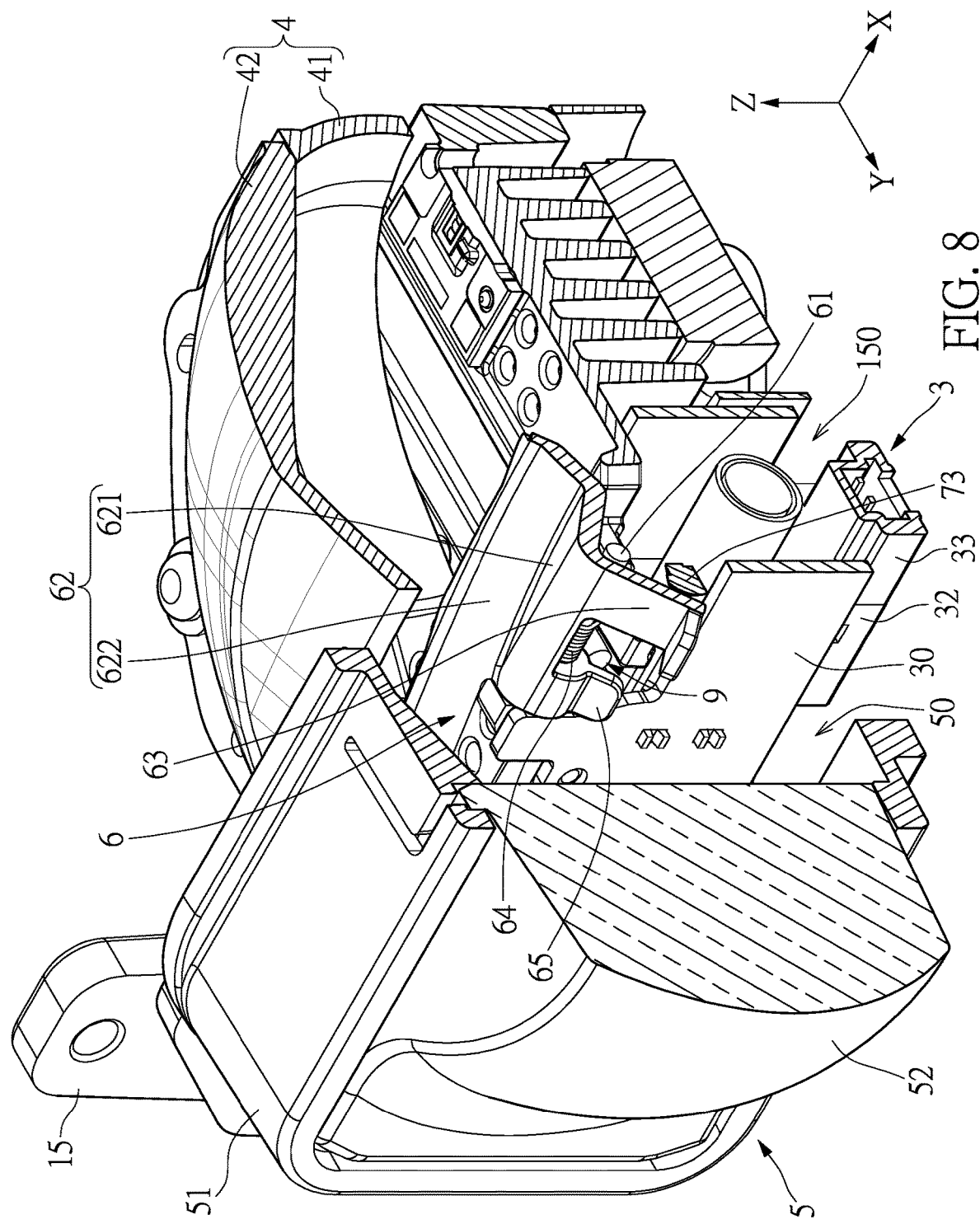
FIG. 8 is a perspective cross-sectional view of the vehicle lamp having the high and low light switching structure in a high beam state according to the present disclosure.
Figure 10:
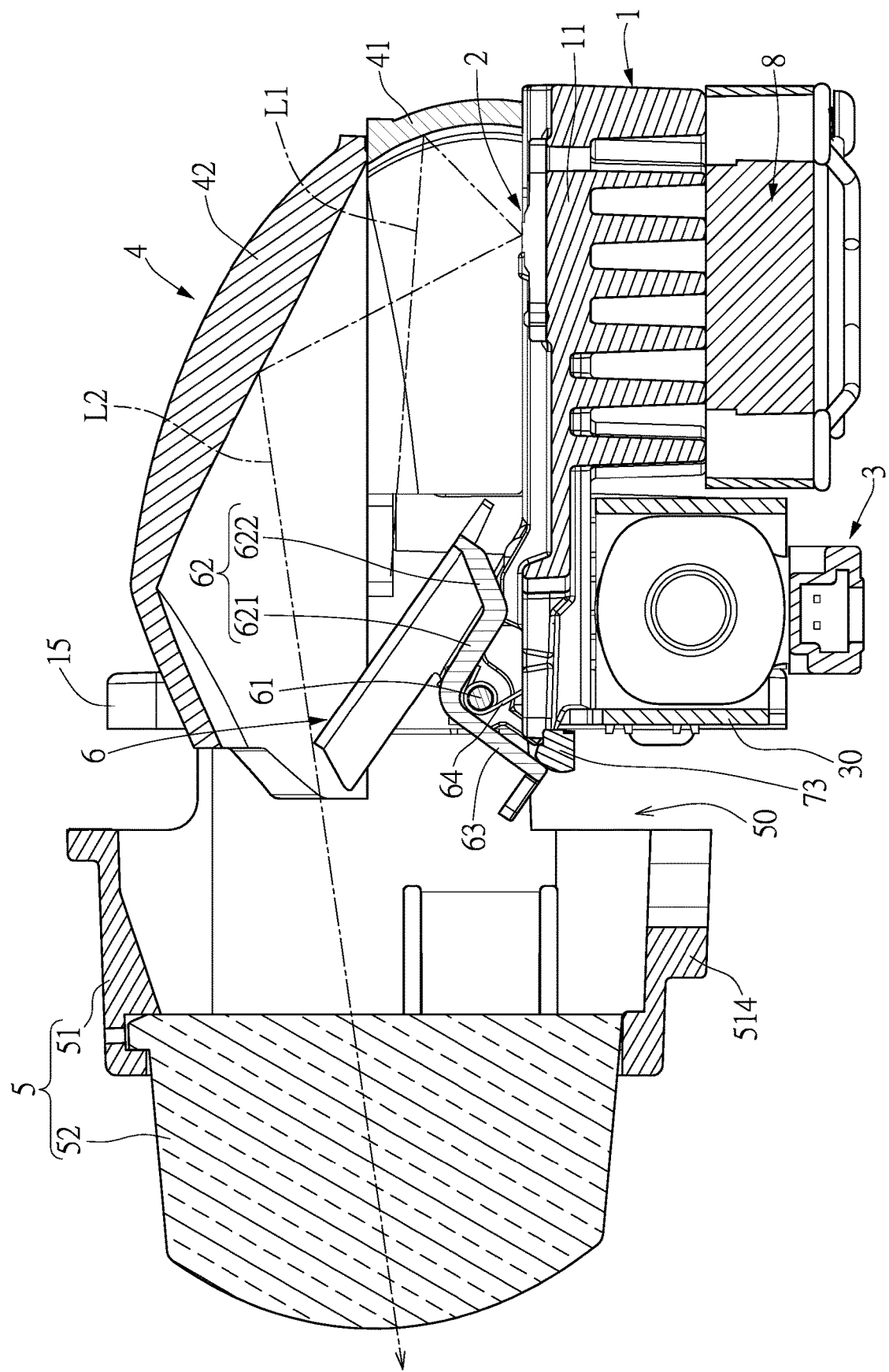
FIG. 10 is a cross-sectional view of the vehicle lamp having the high and low light switching structure in the high beam state according to the present disclosure.

Referring to FIG. 4 to FIG. 6, the light-shaping plate 6 is rotatably disposed between the light-reflecting assembly 4 and the lens assembly 5. The light-shaping plate 6 is pivotally mounted on the heat-dissipating device 1 relative to a rotating shaft 61. As shown in FIG. 3, the rotating shaft 61 is disposed along a horizontal and transverse direction (i.e., X-axis direction). The light-shaping plate 6 can be located above the electromagnet 3. The light-shaping plate 6 can be moved between a first position (as shown in FIG. 4 and FIG. 5, called an upright state) and a second position (as shown in FIG. 8 and FIG. 10, called a reclining state). More particularly, the light-shaping plate 6 has a shielding portion 62 (or a blocking portion) and a linkage portion 63, and the linkage portion 63 is connected to the shielding portion 62.

As shown in FIG. 3 to FIG. 5, an elastic element 64 can be sleeved around (or disposed around) the rotating shaft 61. In this embodiment, the elastic element 64 is a torsion spring sleeved on the rotating shaft 61. The two ends of the elastic element 64 are in contact with the heat-dissipating device 1 and the light-shaping plate 6 respectively, which can provide the elastic force to reset the light-shaping plate 6 so as to move the light-shaping plate 6 to the normal first position (i.e., the original position as shown in FIG. 4 and FIG. 5). Preferably, the shielding portion 62 has a bottom plate 621 and a rear plate 622, the rear plate 622 may be in the shape of a circular arc, and the rear plate 622 is erected (vertically disposed) on the edge of the bottom plate 621. When the light-shaping plate 6 is in the second position (as shown in FIG. 8 and FIG. 10), the light can pass over the middle of the arc-shaped rear plate 622.

As shown in FIG. 5, an included angle θ is formed between the bottom plate 621 and the rear plate 622, and the included angle θ is greater than 90 degrees. For example, the included angle θ can range from 95 degrees to 150 degrees, or the included angle θ can be 95 degrees, 100 degrees, 110 degrees, 120 degrees, 130 degrees, 140 degrees or 150 degrees, etc. The included angle θ is an obtuse angle, so that the bottom plate 621 and the rear plate 622 intersect obliquely, and a better angle is formed between the bottom plate 621 and the rear plate 622. In addition, the height of the rear plate 622 decreases gradually from both sides to the middle, which can allow the vehicle lamp to provide a better light pattern.

Figure 7:
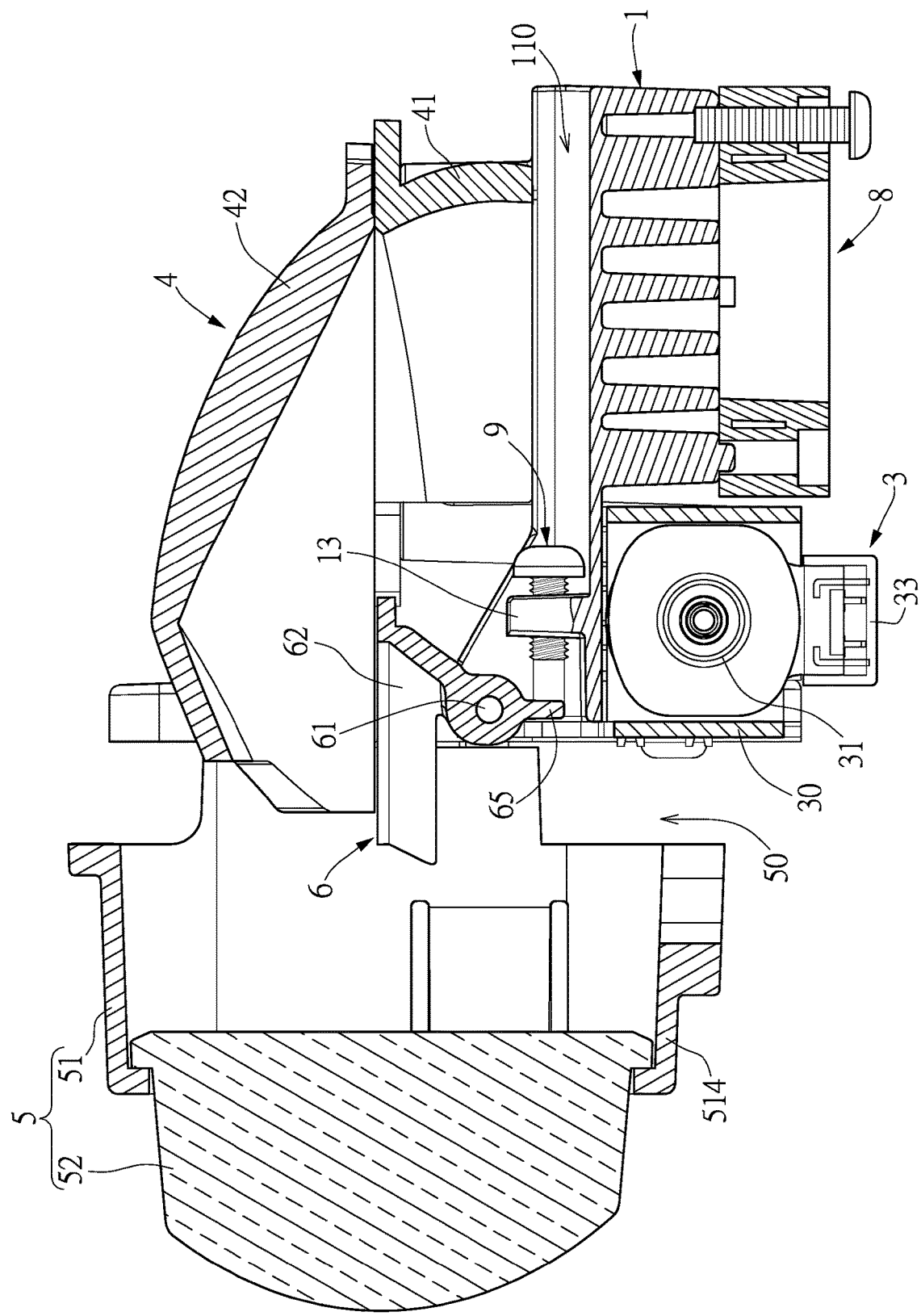
FIG. 7 is a cross-sectional view taken along line VII-VII of FIG. 1.

The driving rod 7 is arranged between the electromagnet 3 and the light-shaping plate 6. The electromagnet 3 can drive the driving rod 7 to move the light-shaping plate 6 to the first position (as shown in FIG. 4 and FIG. 5) or the second position (as shown in FIG. 7 and FIG. 8) so as to change the reflected light generated from the LED light source 2 to form the low beam (i.e., near light) or the high beam (i.e., far light).

As shown in FIG. 6, preferably, the driving rod 7 is integrally formed with a pivot portion 71, an active side 72 and a driven side 73. The active side 72 and the driven side 73 are connected to two sides of the pivot portion 71. The pivot portion 71 is pivotally disposed on a pivot 12 of the heat-dissipating device 1, so that the driving rod 7 can be rotatably disposed on the heat-dissipating device 1. In this embodiment, the pivot 12 extends along the direction (refer to the Z-axis direction as shown in FIG. 6) perpendicular to the optical axis, the active side 72 protrudes outward from the pivot portion 71 and then extends downward along a direction (refer to the Z-axis direction as shown in FIG. 6) perpendicular to the optical axis, and the driven side 73 extends laterally from the other side of the pivot portion 71.

The active side 72 is connected to the electromagnet 3, and the driven side 73 is connected to the light-shaping plate 6. That is to say, the active side 72 can be connected to the actuating rod 31 of the electromagnet 3, and the driven side 73 can be connected to the linkage portion 63 of the light-shaping plate 6. In this embodiment, the active side 72 is abutted against the actuating rod 31 of the electromagnet 3, and the driven side 73 is abutted against the linkage portion 63 of the light-shaping plate 6, which makes assembly simple and easy so as to form a better transmission structure.

More particularly, when the electromagnet 3 is activated (turned on), the actuating rod 31 can reciprocatingly move along the X-axis by cooperation of the horizontal electromagnet 3 so as to push the active side 72 to move left and right along the X direction, so that the pivot portion 71 of the driving rod 7 can be rotated along the Z-axis direction, and finally make the driven side 73 move back and forth along the Y-axis so as to push the linkage portion 63 of the light-shaping plate 6. Thereby, the actuating rod 31 of the electromagnet 3 can drive the light-shaping plate 6 through the driving rod 7 so as to move the light-shaping plate 6 to the first position (as shown in FIG. 4 and FIG. 5) or the second position (as shown in FIG. 8 and FIG. 10).

The structure of the driving rod 7 of the present embodiment can change the actuating direction of the electromagnet 3. Described by another angle, the active side 72 can be moved along a direction (i.e., the left and right direction or the X-axis direction as shown in FIG. 6) perpendicular to the optical axis, and the driven side 73 can move along a direction (i.e., the Y-axis direction as shown in FIG. 6) parallel to the optical axis through the pivot portion 71. Thereby, the actuating rod 31 of the electromagnet 3 can drive and move the light-shaping plate 6 through the driving rod 7. As a supplementary note, in this embodiment, the distance from the active side 72 to the pivot portion 71 can be lengthened to lengthen the moment arm and save more effort in driving.

The advantage of the above structure of the embodiment is that the electromagnet 3 can be placed horizontally on the front side of the heat-dissipating device 1, which can save space (or reduce occupied space) and reduce the overall height. The light-shaping plate 6 can swing back and forth along the rotating shaft 61 through the driving rod 7 due to the movement of the electromagnet 3 along the horizontal direction, so that the structural configuration of the electromagnet 3 and the light-shaping plate 6 is more compact. As shown in FIG. 4 and FIG. 5, the light-shaping plate 6 is in the first position, and the electromagnet 3 can drive the driving rod 7 to rotate the light-shaping plate 6 forward to be in an upright state. The obliquely upward light L1 emitted by the LED light source 2 is blocked when it is reflected by the reflective surface of the light-reflecting assembly 4. That is to say, the shielding portion 62 of the light-shaping plate 6 can be raised upward to block or shield the obliquely upward light L1 that is formed by the lower reflecting seat 41. In addition, the light L2 reflected by the upper reflecting seat 42 can cross over the shielding portion 62, and then the light L2 is transmitted obliquely downward and passes through the lens assembly 5 to form a light shape of the low beam.

Figure 9:
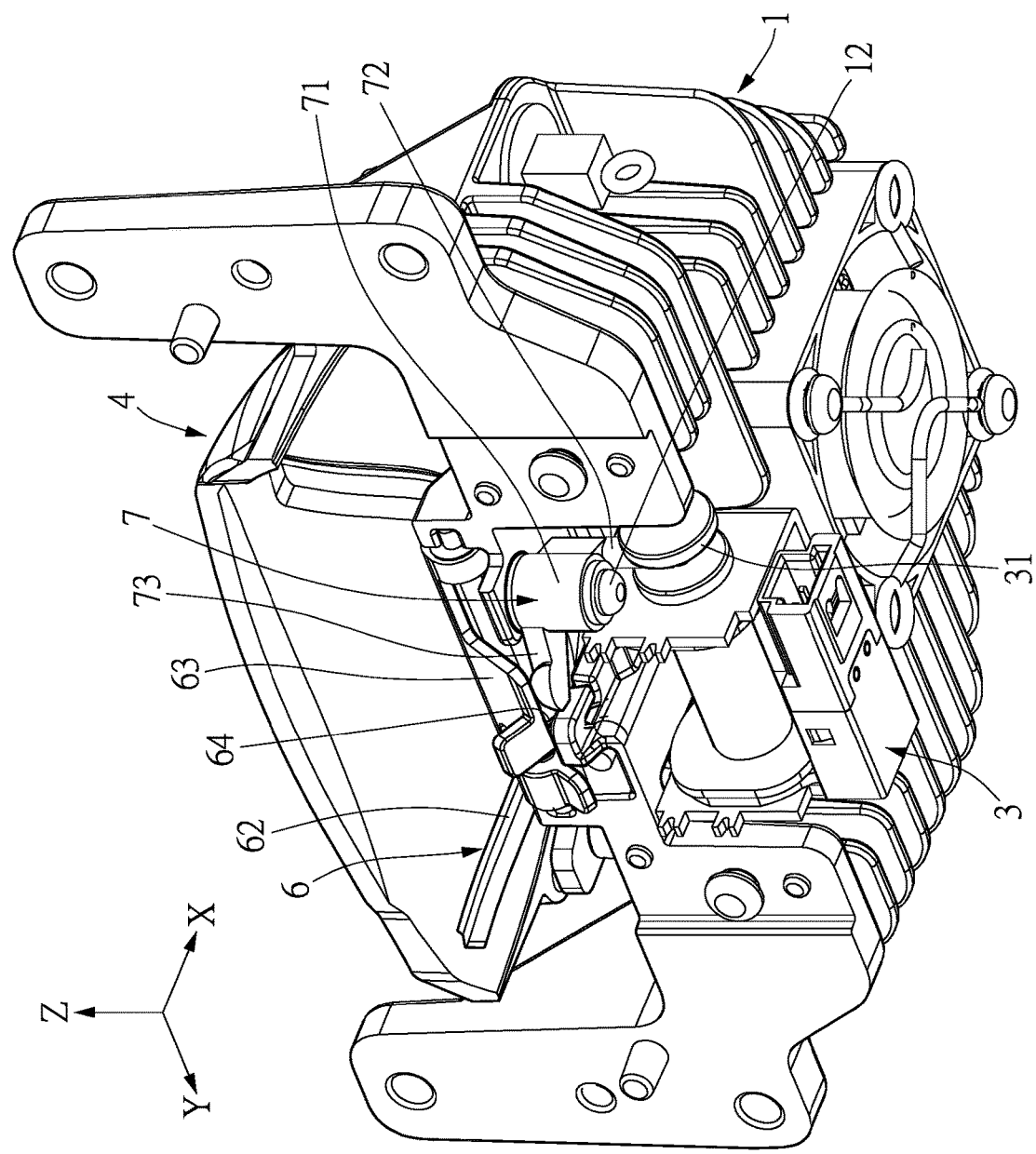
FIG. 9 is a schematic view of the driving rod and the light-shaping plate in the high beam state of the present disclosure.

As shown in FIG. 8 to FIG. 10, the light-shaping plate 6 is in the second position, and the electromagnet 3 can drive the driving rod 7 to move the light-shaping plate 6 downward to be in the reclining state. At this time, the obliquely upward light L1 emitted by the LED light source 2 is not shielded so as to generate a light shape of the high beam when it is reflected by the reflective surface of the light-reflecting assembly 4. That is to say, when the shading portion 62 of the light-shaping plate 6 is lowered downward, the shading portion 62 of the light-shaping plate 6 will not block the light L1 that is inclined upward, so that the light L1 can cross over the middle area of the arc-shaped rear plate 622 to provide high beam. In this way, the light-shaping plate 6 can be used to change the reflected light of the light source to achieve the function of switching the high beam and the low beam.

Referring to FIG. 3 and FIG. 7, the adjusting rod 9 is disposed on the heat-dissipating device 1. The adjusting rod 9 can pass through the heat-dissipating device 1. One side of the adjusting rod 9 abuts against the light-shaping plate 6, and another side of the adjusting rod 9 can be exposed to the rear of the heat-dissipating device 1, so that the adjusting rod 9 can be rotated and adjusted. In this embodiment, the adjusting rod 9 can be a screw, and the adjusting rod 9 is screwed on the heat-dissipating device 1. More particularly, the adjusting rod 9 can be screwed to an adjusting screw seat 13 of the heat-dissipating device 1 (as shown in FIG. 6). The adjusting rod 9 can be arranged horizontally, but it is not limited. The setting angle of adjusting rod 9 can also be changed appropriately. The light-shaping plate 6 has a force bearing portion 65 (or a force receiving portion). The force bearing portion 65 is disposed under the rotating shaft 61, and the force bearing portion 65 may be disposed on one side of the shielding portion 62. One side of the adjusting rod 9 abuts against the force bearing portion 65 of the light-shaping plate 6. When the adjusting rod 9 is rotated, one side of the adjusting rod 9 can push the force bearing portion 65 to drive the light-shaping plate 6, so that the light-shaping plate 6 can be rotated through the force bearing portion 65. In this way, the present embodiment can adjust the position of the light-shaping plate 6, so that the light-shaping plate 6 can be fine-tuned to an optimal position to calibrate the light-shape.

As shown in FIG. 3 and FIG. 7, preferably, the adjusting rod 9 is adjacent to the side of the heat-dissipating device 1. The heat-dissipating device 1 forms an adjusting groove 110 and an adjusting screw seat 13. The adjusting groove 110 extends forward from the rear side of the heat-dissipating device 1. More specifically, the adjusting groove 110 having a semi-cylindrical shape is recessed in the carrier base 11 of the heat-dissipating device 1, and is located at one side of the LED light source 2. The adjusting screw seat 13 is located in the adjusting groove 110 and adjacent to the light-shaping plate 6. The adjusting rod 9 is screwed to the adjusting screw seat 13 of the heat-dissipating device 1. One side of the adjusting rod 9 is exposed at the rear side of the heat-dissipating device 1 for an operator to adjust the adjusting rod 9. Preferably, the adjusting rod 9 can be a screw rod, and the head of which can be turned by a screwdriver. Another side of the adjusting rod 9 abuts against the force bearing portion 65 of the light-shaping plate 6.

Beneficial Effects of the Embodiments

The beneficial effect of the present disclosure is that the vehicle lamp provided by the present disclosure has a far and near lamp switching structure, including a heat-dissipating device, an LED light source, an electromagnet, a light-reflecting assembly, a lens assembly, a light-shaping plate, a driving rod and an adjusting rod. The light emitted by the LED light source can be reflected by the reflective surface of the light-reflecting assembly, and then emitted outwardly through the lens assembly. The light-shaping plate is rotatably disposed between the light-reflecting assembly and the lens assembly, the light-shaping plate is pivotally disposed on the heat-dissipating device along a rotating shaft, and the light-shaping plate is configured to be movably located at one of a first position and a second position, the driving rod is disposed between the electromagnet and the light-shaping plate, and the electromagnet can be configured to drive the driving rod to move the light-shaping plate to the first position or the second position, so as to change the reflected light to form near light or far light.

Furthermore, the lens assembly includes a frame and a lens, the lens is fixed to the front side of the frame, the frame is fixed to the heat-dissipating device, and an empty space is formed between the frame and the heat-dissipating device for accommodating other components.

Moreover, the adjusting rod is disposed on the heat-dissipating device. One side of the adjusting rod abuts against the force bearing portion of the light-shaping plate. When the adjusting rod is rotated, the adjusting rod can push the force bearing portion to drive and adjust the light-shaping plate, so that the light-shaping plate can be rotated through the force bearing portion, and the light-shaping plate can be fine-tuned to an optimal position to calibrate the light-shape, it can reflect light normally, and indeed play the function of low beam illumination.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A vehicle lamp having a dipped and main beam headlight switching structure, comprising:
    a heat-dissipating device having a carrier base; wherein the heat-dissipating device is provided with an adjusting groove and an adjusting screw seat, the adjusting groove has a semi-cylindrical shape and is recessed in the carrier base of the heat-dissipating device, and the adjusting groove is extended forward from a rear side of the heat dissipating device along one side of an LED light source, and wherein the adjusting screw seat is located in the adjusting groove;
    the LED light source disposed on the carrier base of the heat-dissipating device;
    an electromagnet disposed on the heat-dissipating device;
    a light-reflecting assembly located above the LED light source;
    a lens assembly located in front of the light-reflecting assembly, wherein the light-reflecting assembly is configured to reflect light emitted by the LED light source to form reflected light, and the lens assembly is configured to allow the light to pass therethrough;
    a light-shaping plate rotatably disposed between the light-reflecting assembly and the lens assembly, wherein the light-shaping plate is pivotally disposed on the heat-dissipating device along a rotating shaft, the light-shaping plate has a force bearing portion formed under the rotating shaft, and the light-shaping plate is configured to be movably located at one of a first position and a second position; and
    a driving rod disposed between the electromagnet and the light-shaping plate, wherein the electromagnet is configured to drive the driving rod to move the light-shaping plate to the first position or the second position, so as to change the reflected light to form near light or far light;
    an adjusting rod being screwed to the adjusting screw seat of the heat-dissipating device, one side of the adjusting rod is exposed at the rear side of the heat-dissipating device for adjustment, and another side of the adjusting rod abuts against the force bearing portion of the light-shaping plate, wherein a length of the adjusting groove is longer than a length of the adjusting rod;

wherein the lens assembly has a frame and a lens, the lens is fixed on a front side of the frame, the frame is fixed on the heat-dissipating device, and an empty space is formed between the frame and the heat-dissipating device for accommodating components.

2. The vehicle lamp having the dipped and main beam headlight switching structure according to claim 1, wherein the heat-dissipating device has two lateral frames disposed on a front side thereof, and an accommodating space is formed inwardly between the two lateral frames, the electromagnet is accommodated in the accommodating space, and the electromagnet includes an outer partition fixed on the two lateral frames for enclosing the opening of the accommodating space.

3. The vehicle lamp having the dipped and main beam headlight switching structure according to claim 1, wherein the driving rod has a pivot portion, an active side and a driven side, the active side and the driven side are connected to two sides of the pivot portion, the pivot portion is pivotally disposed on a pivot of the heat-dissipating device, the active side is connected to the electromagnet, and the driven side is abutted against the light-shaping plate; wherein the active side is movable along a direction perpendicular to an optical axis, the driven side is movable along a back and forth direction to change a power transmission direction of the electromagnet and the light-shaping plate.

4. The vehicle lamp having the dipped and main beam headlight switching structure according to claim 3, wherein the electromagnet has an actuating rod, the light-shaping plate has a shielding portion and a linkage portion, the linkage portion is connected to the shielding portion, the active side is connected to the actuating rod of the electromagnet, and the driven side is connected to the linkage portion of the light-shaping plate; wherein, when the electromagnet is activated, the actuating rod is configured to drive and move the light-shaping plate through the driving rod; wherein the active side is abutted against the actuating rod of the electromagnet, and the driven side is abutted against the linkage portion of the light-shaping plate.

5. The vehicle lamp having the dipped and main beam headlight switching structure according to claim 1, wherein the light-shaping plate has a shielding portion and a linkage portion, the linkage portion is connected to the shielding portion, the driving rod is connected to the linkage portion of the light-shaping plate, the shielding portion has a bottom plate and a rear plate, the rear plate is shaped as an arc-shaped plate, the rear plate is erected on an edge of the bottom plate, the bottom plate and the rear plate obliquely intersect with each other to form an included angle that is formed between the bottom plate and the rear plate and is greater than 90 degrees.

6. The vehicle lamp having the dipped and main beam headlight switching structure according to claim 1, wherein the electromagnet is disposed on a front side of the heat-dissipating device, and the electromagnet is horizontally placed on the front side of the heat-dissipating device.

7. The vehicle lamp having the dipped and main beam headlight switching structure according to claim 1, wherein the light-shaping plate is located above the electromagnet, and an elastic element is disposed between the heat-dissipating device and the light-shaping plate to provide an elastic force for resetting the light-shaping plate so as to move the light-shaping plate to the first position.

8. The vehicle lamp having the dipped and main beam headlight switching structure according to claim 1, wherein the light-reflecting assembly includes an upper reflecting seat and a lower reflecting seat, the lower reflecting seat is shaped as a U shape and fixed to the heat-dissipating device, the upper reflecting seat is fixed on a top surface of the lower reflecting seat, the light reflected by the lower reflecting seat of the LED light source forms a high beam, and the light reflected by the lower reflecting seat of the LED light source forms a low beam.

9. The vehicle lamp having the dipped and main beam headlight switching structure according to claim 8, wherein the lower reflecting seat has a lower reflection part and a lower assembly plate, the lower assembly plate is connected around a top edge of the lower reflection part, the heat-dissipating device has a plurality of positioning posts protruded upwardly from the carrier base thereof, the lower assembly plate has a plurality of lower positioning holes, and the lower positioning holes are respectively sleeved on the positioning posts, so that the lower reflecting seat is uplifted above the carrier base by the positioning posts, and a gap is formed between a lower edge of the lower reflecting seat and the heat-dissipating device adjacent to the LED light source; wherein the upper reflecting seat has an upper reflection part and an upper assembly plate, the upper assembly plate is connected around a bottom edge of the upper reflection part, the upper assembly plate forms a plurality of upper positioning holes and a plurality of screw holes, the upper positioning holes of the upper assembly plate are respectively sleeved on the positioning posts, and the upper reflecting seat and the lower reflecting seat are fixed to the heat-dissipating device.

* * * * *